(12) United States Patent
Goldfarbmuren et al.

(10) Patent No.: US 11,015,847 B2
(45) Date of Patent: May 25, 2021

(54) CYCLE ENHANCEMENT METHODS, SYSTEMS, AND DEVICES

(71) Applicant: Rebound Technologies, Inc., Commerce City, CO (US)

(72) Inventors: Russell Goldfarbmuren, Denver, CO (US); Luke Erickson, Denver, CO (US)

(73) Assignee: Rebound Technologies, Inc., Commerce City, CO (US)

( * ) Notice: Subject to any disclaimer, the term of this patent is extended or adjusted under 35 U.S.C. 154(b) by 0 days.

(21) Appl. No.: 16/813,023

(22) Filed: Mar. 9, 2020

(65) Prior Publication Data

US 2020/0318867 A1     Oct. 8, 2020

Related U.S. Application Data

(63) Continuation of application No. 15/935,005, filed on Mar. 25, 2018, now Pat. No. 10,584,904.
(Continued)

(51) Int. Cl.
    *F25B 1/10*         (2006.01)
    *F25B 30/06*      (2006.01)
    (Continued)

(52) U.S. Cl.
    CPC ............... *F25B 30/06* (2013.01); *F25B 1/10* (2013.01); *F25B 5/02* (2013.01); *F25B 9/14* (2013.01);
    (Continued)

(58) Field of Classification Search
    CPC .......................... F25B 2400/05; F25B 2500/18
    See application file for complete search history.

(56) References Cited

U.S. PATENT DOCUMENTS

| | | |
|---|---|---|
| 952,040 A | 3/1910 | Hall |
| 2,089,886 A | 8/1937 | Friedrich |

(Continued)

FOREIGN PATENT DOCUMENTS

| | | |
|---|---|---|
| JP | H-1252838 | 10/1989 |
| JP | H11-108298 | 4/1999 |

(Continued)

OTHER PUBLICATIONS

International Search Report and Written Opinion, Int'l Appl. No. PCT/US18/24436, dated Jun. 15, 2018, ISA-USPTO.
(Continued)

*Primary Examiner* — Filip Zec
(74) *Attorney, Agent, or Firm* — Wilson Patent Law, LLC

(57) ABSTRACT

Methods, systems, and device for cycle enhancement are provided in accordance with various embodiments. Various embodiments generally pertain to refrigeration and heat pumping. Different embodiments may be applied to a variety of heat pump architectures. Some embodiments may integrate with vapor compression heat pumps in industrial, commercial, and/or residential applications. Some embodiments include a method that may include at least: removing a first heat from a vapor compression cycle; utilizing the first removed heat from the vapor compression cycle to drive a thermally driven heat pump; or removing a second heat from the vapor compression cycle utilizing the thermally driven heat pump to reduce a temperature of a refrigerant of the vapor compression cycle below an ambient temperature.

20 Claims, 9 Drawing Sheets

Related U.S. Application Data

(60) Provisional application No. 62/477,162, filed on Mar. 27, 2017.

(51) Int. Cl.

| | | |
|---|---|---|
| *F25B 9/14* | (2006.01) | |
| *F25B 5/02* | (2006.01) | |
| *F25B 25/02* | (2006.01) | |
| *F25B 40/02* | (2006.01) | |
| *F25B 25/00* | (2006.01) | |
| *F25B 40/04* | (2006.01) | |
| *F25B 41/31* | (2021.01) | |

(52) U.S. Cl.
CPC .......... *F25B 25/005* (2013.01); *F25B 25/02* (2013.01); *F25B 40/02* (2013.01); *F25B 40/04* (2013.01); *F25B 41/31* (2021.01); *F25B 2400/05* (2013.01); *F25B 2400/13* (2013.01); *F25B 2500/18* (2013.01)

(56) References Cited

U.S. PATENT DOCUMENTS

| | | | |
|---|---|---|---|
| 2,590,269 A | 3/1952 | Pike | |
| 2,715,945 A | 8/1955 | Hankison | |
| 3,146,606 A | 9/1964 | Grimes | |
| 3,247,678 A | 4/1966 | Mohlman | |
| 3,257,818 A | 6/1966 | Papapanu | |
| 3,398,543 A | 8/1968 | Horton | |
| 3,747,333 A | 7/1973 | Gertsmann | |
| 3,879,956 A | 4/1975 | Ganiaris | |
| 4,471,630 A | 9/1984 | Sugimoto | |
| 4,539,076 A | 9/1985 | Swain | |
| 4,584,843 A | 4/1986 | Pronger | |
| 4,809,513 A | 3/1989 | Goldstein | |
| 4,822,391 A | 4/1989 | Rockenfeller | |
| 4,907,415 A | 3/1990 | Stewart | |
| 5,055,185 A | 10/1991 | McMurphy | |
| 5,207,075 A | 5/1993 | Gundlach | |
| 5,255,526 A | 10/1993 | Fischer | |
| 5,632,148 A * | 5/1997 | Bronicki | F01K 23/10 60/728 |
| 5,678,626 A | 10/1997 | Gilles | |
| 5,941,089 A | 8/1999 | Takaishi | |
| 6,012,298 A | 1/2000 | Goldstein | |
| 6,038,876 A | 3/2000 | Lang | |
| 6,253,116 B1 | 6/2001 | Zhang | |
| 9,310,140 B2 | 4/2016 | Muren | |
| 9,360,242 B2 | 6/2016 | Muren | |
| 9,766,017 B2 * | 9/2017 | Fujitsuka | F24D 17/0078 |
| 9,885,524 B2 | 2/2018 | Muren | |
| 9,913,411 B2 * | 3/2018 | De Bock | H05K 7/20336 |
| 10,584,904 B2 | 3/2020 | Goldfarbmuren | |
| 2003/0066906 A1 | 4/2003 | Krause | |
| 2005/0095476 A1 | 5/2005 | Schrooten | |
| 2006/0141331 A1 | 6/2006 | Reiser | |
| 2007/0062853 A1 | 3/2007 | Spani | |
| 2007/0134526 A1 | 6/2007 | Numao | |
| 2007/0137223 A1 | 6/2007 | Brekke | |
| 2008/0142166 A1 | 6/2008 | Carson | |
| 2009/0019861 A1 | 1/2009 | Heckt | |
| 2009/0044935 A1 | 2/2009 | Nutsos | |
| 2009/0293507 A1 | 12/2009 | Narayanamurthy | |
| 2009/0312851 A1 | 12/2009 | Mishra | |
| 2010/0145114 A1 | 6/2010 | Abhari | |
| 2010/0206812 A1 | 8/2010 | Woods | |
| 2010/0218542 A1 | 9/2010 | McCollough | |
| 2010/0218917 A1 | 9/2010 | Barnwell | |
| 2010/0281907 A1 * | 11/2010 | Giertz | F25B 30/06 62/324.6 |
| 2010/0310954 A1 | 12/2010 | Odgaard | |
| 2011/0023505 A1 | 2/2011 | Popov | |
| 2012/0103005 A1 | 5/2012 | Kopko | |
| 2012/0193067 A1 | 8/2012 | Miller | |
| 2013/0199753 A1 | 8/2013 | Muren | |
| 2013/0227983 A1 | 9/2013 | Jeong | |
| 2013/0327407 A1 | 12/2013 | Hermann | |
| 2014/0102662 A1 * | 4/2014 | Grama | F28D 20/0034 165/10 |
| 2014/0102672 A1 | 4/2014 | Campbell | |
| 2015/0114019 A1 * | 4/2015 | Van Gysel | F24D 17/001 62/238.7 |
| 2016/0187065 A1 | 6/2016 | Muren | |
| 2016/0290735 A1 | 10/2016 | Muren | |
| 2018/0252477 A1 | 9/2018 | Goldfarbmuren | |
| 2018/0283745 A1 | 10/2018 | Goldfarbmuren | |
| 2019/0137158 A1 | 5/2019 | Goldfarbmuren | |

FOREIGN PATENT DOCUMENTS

| | | |
|---|---|---|
| WO | WO2009070728 | 6/2009 |
| WO | WO2011162669 | 12/2011 |
| WO | WO2012036166 | 3/2012 |
| WO | WO2014100330 | 6/2014 |
| WO | WO2014111012 | 7/2014 |
| WO | WO2014191230 | 12/2014 |
| WO | WO2016049612 | 3/2016 |
| WO | WO2017165378 | 9/2017 |
| WO | WO2018183238 | 10/2018 |
| WO | WO2019165328 | 8/2019 |
| WO | WO2020132467 | 6/2020 |

OTHER PUBLICATIONS

Restriction Requirement, U.S. Appl. No. 15/935,005, dated Jun. 20, 2019, USPTO.
Notice of Allowance, U.S. Appl. No. 15/935,005, dated Oct. 8, 2019, USPTO.
International Search Report and Written Opinion, Int'l Appl. No. PCT/US2019/067892, dated Feb. 20, 2020, ISA-USPTO.
Office Action, Chinese Appl. No. 201880035102.3, dated Jul. 16, 2020, CNIPA.
Extended European Search Report and Search Opinion, European Appl. No. 18777347.8, dated Nov. 18, 2020, EPO.
Jonathan Nicholls, Thermal Approach to Grid Energy Storage, Oregon Future Energy Conference, Apr. 26, 2012, available at http://ns2.thesegurogroup.com/event/images/stories/PDFs/4b_nicholls.pdf.
Sadao Nishimura, Ultra Eco-Ice System, Feb. 3, 2014, available at http://www.atmo.org/media.presentation.php?id=371.
Non-Final Office Action, U.S. Appl. No. 13/761,463, dated Aug. 20, 2015, USPTO.
Notice of Allowance, U.S. Appl. No. 13/761,463, dated Jan. 13, 2016, USPTO.
Notice of Allowance, U.S. Appl. No. 15/090,756, dated Aug. 21, 2017, USPTO.
Restriction Requirement, U.S. Appl. No. 15/855,048, dated Mar. 8, 2019, USPTO.
Non-Final Office Action, U.S. Appl. No. 15/855,048, dated Jun. 10, 2019, USPTO.
Final Office Action, U.S. Appl. No. 15/855,048, dated Feb. 27, 2020, USPTO.
Advisory Action, U.S. Appl. No. 15/855,048, dated Jun. 9, 2020, USPTO.
Notice of Panel Decision from Pre-Appeal Brief Review, U.S. Appl. No. 15/855,048, dated Oct. 5, 2020, USPTO.
Notice of Allowance, U.S. Appl. No. 14/280,080, dated Mar. 28, 2016, USPTO.
Extended European Search Report and Search Opinion, European Appl. No. 15844161.8, dated Apr. 26, 2018, EPO.
First Examination Report, European Appl. No. 15844161.8, dated Mar. 13, 2019, EPO.
Intention to Grant, European Appl. No. 15844161.8, dated Sep. 30, 2019, EPO.
International Search Report and Written Opinion, Int'l Appl. No. PCT/US2015/052521, dated Dec. 14, 2015, ISA-USPTO.
Restriction Requirement, U.S. Appl. No. 14/865,727, dated Jul. 27, 2017, USPTO.

(56) References Cited

OTHER PUBLICATIONS

Non-Final Office Action, U.S. Appl. No. 14/865,727, dated Dec. 1, 2017, USPTO.
Final Office Action, U.S. Appl. No. 14/865,727, dated Aug. 6, 2018, USPTO.
Advisory Action, U.S. Appl. No. 14/865,727, dated Oct. 24, 2018, USPTO.
Non-Final Office Action, U.S. Appl. No. 14/865,727, dated Mar. 18, 2019, USPTO.
Final Office Action, U.S. Appl. No. 14/865,727, dated Dec. 23, 2019, USPTO.
Notice of Panel Decision from Pre-Appeal Brief Review, U.S. Appl. No. 14/865,727, dated Nov. 6, 2020, USPTO.
Notice of Allowance, U.S. Appl. No. 14/865,727, dated Nov. 13, 2020, USPTO.
Office Action, Japanese Appl. No. JP 2016-576018, dated Aug. 6, 2019, JPO.
Decision to Grant a Patent, Japanese Appl. No. JP 2016-576018, dated Jun. 30, 2020, JPO.
International Search Report and Written Opinion, Int'l Appl. No. PCT/US17/23356, dated Jun. 16, 2017, ISA-USPTO.
Non-Final Office Action, U.S. Appl. No. 16/136,452, dated Apr. 22, 2020, USPTO.
Final Office Action, U.S. Appl. No. 16/136,452, dated Dec. 21, 2020, USPTO.
Extended European Search Report and Search Opinion, European Appl. No. 17770960.7, dated Oct. 30, 2019, EPO.
Rebound Technologies, "Lab notebook: icepoint™ is ready to keep your ice cream cold," Jan. 20, 2015, https://www.rebound-tech.com/lab-notebook-icepoint-is-ready-to-keep-your-ice-cream-cold/ (last visited Jan. 26, 2021).
International Search Report and Written Opinion, Int'l Appl. No. PCT/2019/019323, dated Apr. 26, 2019, ISA-USPTO.

* cited by examiner

CYCLE ENHANCEMENT METHODS, SYSTEMS, AND DEVICES

CROSS-REFERENCES TO RELATED APPLICATIONS

This application is a non-provisional patent application claiming priority benefit of U.S. provisional patent application Ser. No. 62/477,162, filed on Mar. 27, 2017 and entitled "CYCLE ENHANCEMENT METHODS, SYSTEMS, AND DEVICES," the entire disclosure of which is herein incorporated by reference for all purposes. This application is also a non-provisional continuation application claiming priority benefit of U.S. non-provisional patent application Ser. No. 15/935,005, filed on Mar. 25, 2018 and entitled "CYCLE ENHANCEMENT METHODS, SYSTEMS, AND DEVICES," now U.S. Pat. No. 10,584,904, which issued on Mar. 10, 2020.

GOVERNMENT LICENSE RIGHTS

This invention was made with Government support under Contract 1533939 awarded by the National Science Foundation. The Government has certain rights in the invention.

BACKGROUND

Different tools and techniques may be utilized for refrigeration and/or heat pumping. There may be a need for new tools and techniques that may improve performance and/or efficiency.

SUMMARY

Methods, systems, and device for cycle enhancement are provided in accordance with various embodiments. Various embodiments generally pertain to refrigeration and heat pumping. Different embodiments may be applied to a variety of heat pump architectures. Some embodiments may integrate with vapor compression heat pumps in industrial, commercial, and/or residential applications. Some embodiments may integrate with direct expansion, economized, and/or 2-stage vapor compression heat pumps, for example.

Some embodiments may include the integration of freeze point suppression cycles and vapor compression cycles, which may achieve an overall efficiency and dispatchability benefit with minimal complexity. Some embodiments may use the waste produced by the vapor compression cycle to power a smaller freeze point suppression cycle that then may provide a small amount of cooling back to the vapor compression cycle to improve performance. Some embodiments may utilize an absorption heat pump.

Some embodiments include the movement of heat from the refrigerant of the vapor compression cycle to the refrigerant of the freeze point suppression cycle. This heat transfer may be accomplished through the placement of heat exchangers in both cycles thermally connecting them.

For example, some embodiments include a method that may include at least: removing a first heat from a vapor compression cycle; utilizing the first removed heat from the vapor compression cycle to drive a thermally driven heat pump; and/or removing a second heat from the vapor compression cycle utilizing the thermally driven heat pump to reduce a temperature of a refrigerant of the vapor compression cycle below an ambient temperature.

In some embodiments of the method, utilizing the first removed heat from the vapor compression cycle to drive the thermally driven heat pump includes separating a freeze point suppressant from a refrigerant of the thermally driven heat pump to form a concentrated freeze point suppressant. Removing the second heat from the vapor compression cycle utilizing the thermally driven heat pump to reduce the temperature of the refrigerant of the vapor compression cycle below the ambient temperature may include: combining the concentrated freeze point suppressant with a solid material to form at least a portion of the refrigerant of the thermally driven heat pump; and/or utilizing the portion of the refrigerant of the thermally drive heat pump to reduce the temperature of the refrigerant of the vapor compression cycle below the ambient temperature. In some embodiments, the method may improve the vapor compression cycle.

In some embodiments of the method, removing the first heat from the vapor compression cycle includes passing the refrigerant of the vapor compression cycle through a first heat exchanger that is thermally coupled with the thermally driven heat pump. The first heat exchanger may be positioned between a compressor of the vapor compression cycle and a condenser of the vapor compression cycle.

In some embodiments of the method, removing the second heat from the vapor compression cycle utilizing the thermally driven heat pump to reduce the temperature of refrigerant of the vapor compression cycle below the ambient temperature includes passing the refrigerant of the vapor compression cycle through a second heat exchanger positioned between a condenser of the vapor compression cycle and an expansion valve of the vapor compression cycle. In some embodiments, removing the second heat from the vapor compression cycle utilizing the thermally driven heat pump to reduce the temperature of refrigerant of the vapor compression cycle below the ambient temperature includes passing a refrigerant of the thermally driven heat pump through the second heat exchanger.

Some embodiments of the method include utilizing a receiving vessel to receive at least a liquid form of the refrigerant of the vapor compression cycle or a vapor form of the refrigerant of the vapor compression cycle after the refrigerant of the vapor compression cycle passes through the expansion valve of the vapor compression cycle. Some embodiments include: directing the vapor form of the refrigerant to the compressor of the vapor compression cycle; and/or directing at least a first portion of the liquid form of the refrigerant of the vapor compression cycle to a third heat exchanger; the third heat exchanger may be thermally coupled with a refrigerant of the thermally driven heat pump and may further cool the first portion of the liquid form of the refrigerant of the vapor compression cycle below the ambient temperature through removing a third heat from the vapor compression cycle. Some embodiments include utilizing the second heat exchanger and the third heat exchanger in series. Some embodiments include utilizing the second heat exchanger and the third heat exchanger in parallel.

Some embodiments of the method include forming a solid material through directing at least a second portion of the liquid form of the refrigerant of the vapor compression cycle to a solid maker. The solid material may include a frozen material, for example. Some embodiments include: combining a freeze point suppressant with the solid material to form at least a portion of a refrigerant of the thermally driven heat pump; and/or passing the portion of the refrigerant of the thermally driven heat pump through the second heat exchanger to reduce the temperature of the refrigerant of the vapor compression cycle below the ambient temperature.

Some embodiments of the method include: directing the liquid form of the refrigerant of the vapor compression cycle to a second expansion valve; and/or passing the refrigerant of the vapor compression cycle that has passed through the second expansion valve to a fourth heat exchanger to remove a fourth heat from the vapor compression cycle. Some embodiments include utilizing the fourth removed heat from the vapor compression cycle to drive the thermally driven heat pump. In some embodiments, utilizing the fourth removed heat from the vapor compression cycle to drive the thermally driven heat pump includes separating a freeze point suppressant from a refrigerant of the thermally driven heat pump to form a concentrated freeze point suppressant.

Some embodiments of the method include directing the refrigerant of the vapor compression cycle from the fourth heat exchanger to the receiving vessel. Some embodiments include directing at least a third portion of the liquid form of the refrigerant of vapor compression cycle to a fifth heat exchanger; the fifth heat exchanger may be thermally coupled with the refrigerant of the thermally driven heat pump and may further cool the third portion of the liquid form of the refrigerant of the vapor compression cycle below the ambient temperature through removing a fifth heat from the vapor compression cycle. Some embodiments include: directing the refrigerant of the vapor compression cycle from the fourth heat exchanger to the compressor; and/or directing the refrigerant of the vapor compression cycle from the fifth heat exchanger to the compressor.

Some embodiments include a system that may include a first heat exchanger coupled with a vapor compression cycle to remove a first heat from the vapor compression cycle and coupled with a thermally driven heat pump to drive the thermally driven heat pump utilizing the first removed heat from the vapor compression cycle. Some embodiments of the system include a second heat exchanger coupled with the vapor compression cycle to remove a second heat from the vapor compression and coupled with the thermally driven heat pump; removing the second heat from the vapor compression cycle may reduce a temperature of a refrigerant of the vapor compression cycle below an ambient temperature.

In some embodiments of the system, the first heat exchanger is positioned between a compressor of the vapor compression cycle and a condenser of the vapor compression cycle. In some embodiments of the system, the second heat exchanger is positioned between the condenser of the vapor compression cycle and an expansion valve of the vapor compression cycle.

In some embodiments of the system, the thermally driven heat pump includes a freeze point suppressant cycle. In some embodiments, the first removed heat from the vapor compression cycle drives the thermally driven heat pump through separating a freeze point suppressant from a refrigerant of the thermally driven heat pump to form a concentrated freeze point suppressant. In some embodiments, the thermally driven heat pump includes a solid maker. In some embodiments, the thermally driven heat pump is configured to combine a solid from the solid maker with the concentrated freeze point suppressant to form at least a portion of the refrigerant of the thermally driven heat pump; the second heat exchanger may be configured to receive the portion of the refrigerant of the thermally driven heat pump to reduce the temperature of the refrigerant of the vapor compression cycle below the ambient temperature.

Some embodiments of the system include a receiving vessel positioned to receive at least a liquid form of the refrigerant of the vapor compression cycle or a vapor form of the refrigerant of the vapor compression cycle after the refrigerant of the vapor compression cycle passes through the expansion valve of the vapor compression cycle. Some embodiments include a third heat exchanger configured to receive at least a first portion of the liquid form of the refrigerant of the vapor compression cycle; the third heat exchanger may be thermally coupled with the refrigerant of the thermally driven heat pump and may further cool the first portion of the liquid form of the refrigerant of the vapor compression cycle below the ambient temperature through removing a third heat from the vapor compression cycle. In some embodiments, the second heat exchanger and the third heat exchanger are utilized in series. In some embodiments, the second heat exchanger and the third heat exchanger are utilized in parallel.

In some embodiments of the system, the receiving vessel is coupled with the thermally driven heat pump such that at least a second portion of the liquid form of the refrigerant of the vapor compression cycle is directed to a solid maker of the thermally driven heat pump.

Some embodiments of the system include a fourth heat exchanger positioned to receive a portion of the refrigerant of the vapor compression cycle that passes through the third heat exchanger to remove a fourth heat from the vapor compression cycle. In some embodiments, the fourth heat exchanger and the thermally driven heat pump are coupled with each other such that the fourth removed heat from the vapor compression cycle drives the thermally driven heat pump. In some embodiments, the thermally driven heat pump includes a separator configured to receive the fourth removed heat from the vapor compression cycle to separate a freeze point suppressant from the refrigerant of the thermally driven heat pump to form a concentrated freeze point suppressant. In some embodiments, the thermally driven heat pump is configured to combine a solid from a solid maker with the concentrated freeze point suppressant to form at least a portion of a refrigerant of the thermally driven heat pump; the second heat exchanger may be configured to receive the portion of the refrigerant of the thermally driven heat pump to reduce the temperature of the refrigerant of the vapor compression cycle below the ambient temperature.

In some embodiments of the system, the fourth heat exchanger is coupled with the receiving vessel such that the receiving vessel receives the portion of the refrigerant from the vapor compression cycle that has passed through the fourth heat exchanger. Some embodiments include a fifth heat exchanger that is thermally coupled with the refrigerant of the thermally driven heat pump to remove a fifth heat from the vapor compression cycle and may be coupled with the receiving vessel to receive at least a third portion of the liquid form of the refrigerant of the vapor compression cycle that may be further cooled below the ambient temperature through removing the fifth heat from the vapor compression cycle.

In some embodiments of the system, the fourth heat exchanger is coupled with the compressor to direct the refrigerant of the vapor compression cycle from the fourth heat exchanger to the compressor. In some embodiments, the fifth heat exchanger is coupled with the compressor to direct the refrigerant of the vapor compression cycle from the fifth heat exchanger to the compressor.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
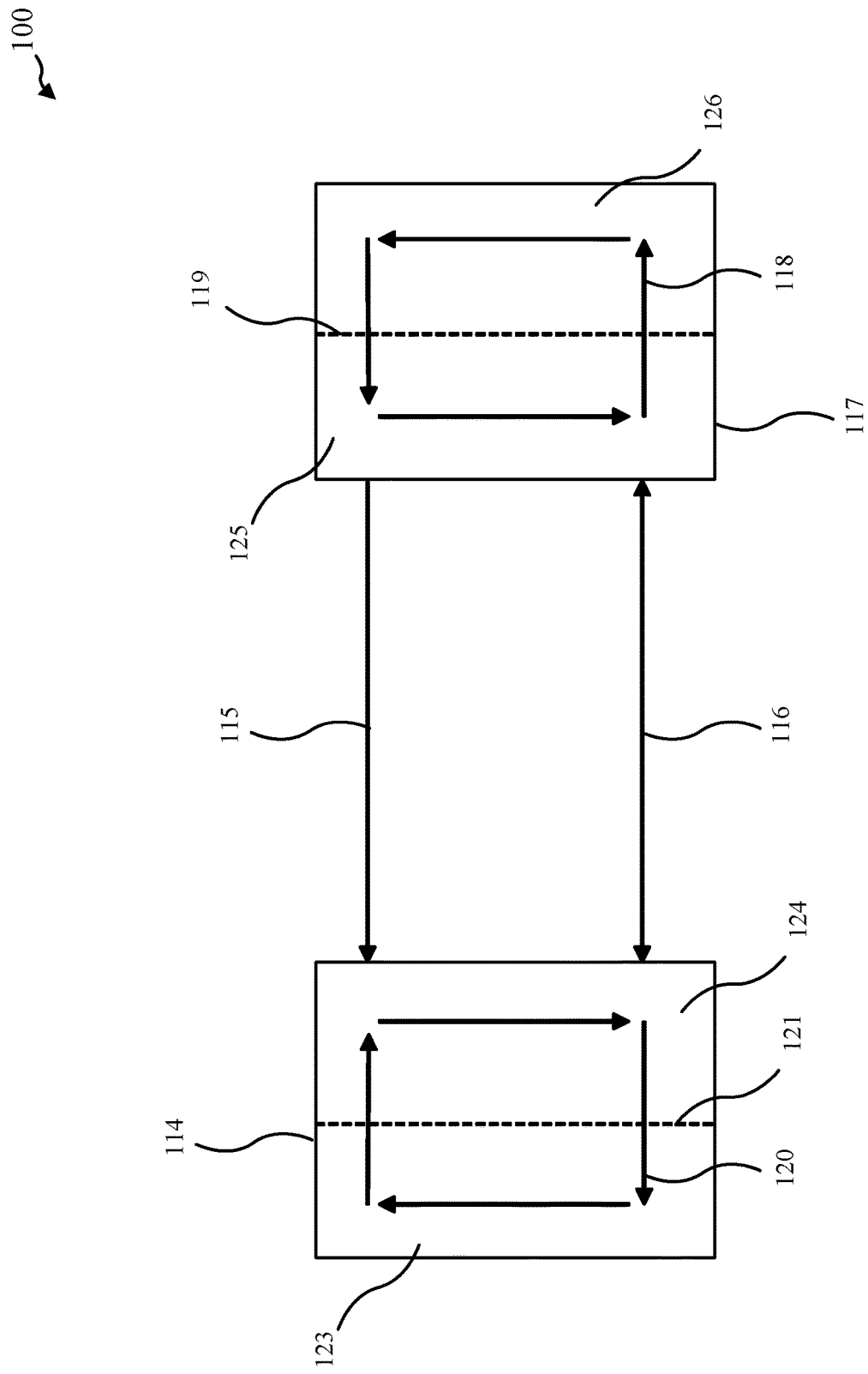
FIG. 1 shows a system in accordance with various embodiments.

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Methods, systems, and device for cycle enhancement are provided in accordance with various embodiments. Various embodiments generally pertain to refrigeration and heat pumping. Different embodiments may be applied to a variety of heat pump architectures. Some embodiments may integrate with vapor compression heat pumps in industrial, commercial, and/or residential applications. Some embodiments may integrate with direct expansion, economized, and/or 2-stage vapor compression heat pumps, for example.

Some embodiments include the integration of freeze point suppression cycles and vapor compression cycles, which may achieve an overall efficiency and dispatchability benefit with minimal complexity. Some embodiments may use the waste produced by the vapor compression cycle to power a smaller freeze point suppression cycle that then may provide a small amount of cooling back to the vapor compression cycle to improve performance.

Some embodiments include the movement of heat from the refrigerant of the vapor compression cycle to the refrigerant of the freeze point suppression cycle. This heat transfer may be accomplished through the placement of heat exchangers in both cycles thermally connecting them.

In some embodiments, once these thermal connections exist, the heat may be taken from the superheated refrigerant leaving the compressor in the vapor compression cycle and may be used to power the separation of a freeze point suppression cycle. The low temperature refrigeration produced by the freeze point suppression cycle may then be used by the vapor compression cycle to cool its condensed refrigerant before it may enter the expansion valve.

In some embodiments, the vapor compression/s waste heat produced by the compressor may be captured and may be used by the freeze point suppression cycle and then may be returned to the vapor compression cycle as useful cooling. This back and forth may reduce the compressor work of the vapor compression cycle and may allow for higher efficiency.

The following embodiments shown here may show all fluid lines and heat exchangers as non-integral from any other pieces of process equipment. One skilled in the art knows that this may not always be the case and are merely depicted here for clarity. For example, the heat exchangers shown in some embodiment used to capture the waste heat may be a separate heat exchanger as shown, or it may be integrated into the column and fed directly with superheated refrigerant. For clarity, the non-integrated versions may be shown in some embodiments.

Turning now to FIG. 1, a system 100 is provided in accordance with various embodiments. A vapor compression cycle 117 may have a circulating refrigerant 118 of the vapor compression cycle 117 that may be moving from a high-pressure side 125 and a low-pressure side 126. When the refrigerant 118 of the vapor compression cycle 117 may cross the boundary 119 from low pressure 126 to high pressure 125, it may acquire heat energy 115 that may be transferred to a thermally driven heat pump 114. The heat 115 may be absorbed by the thermally driven heat pump 114. The heat 115 may drive the thermally driven heat pump 114. Cooling 116 produced by the thermally driven heat pump 114 may be passed back to the vapor compression cycle 117; this may also be referred to as removing heat 116 from the vapor compression cycle 117.

System 100 may be configured to include removing heat 115, which may be referred to as a first removed heat, from vapor compression cycle 117. The heat 115 from the vapor compression cycle 117 may drive the thermally driven heat pump 114. In some embodiments, cooling 116 may remove heat, which may be referred to as a second removed heat, from the vapor compression cycle 117 utilizing the thermally driven heat pump 114 to reduce a temperature of the refrigerant 118 of the vapor compression cycle 117 below an ambient temperature.

In some embodiments, the thermally driven heat pump 114 includes a freeze point suppression cycle. The heat 115 may be absorbed into the high concentration side 124 of the freeze point suppressant cycle that may have a circulating refrigerant 120 moving between a low concentration side 123 and a high concentration side 124, with a boundary 121. The cooling 116 produced by the freeze point suppression on the high concentration side 124 of the freeze point suppressant cycle may be passed back to the vapor compression cycle 117. In some embodiments of the system 100, utilizing the first removed heat 115 from the vapor compression cycle 117 to drive the thermally driven heat pump 114 includes separating a freeze point suppressant from a refrigerant 120 of the thermally driven heat pump 114 to form a concentrated freeze point suppressant. Removing the second heat 116 from the vapor compression cycle 117 utilizing the thermally driven heat pump 114 to reduce the temperature of the refrigerant 118 of the vapor compression cycle 117 below the ambient temperature may include: combining the concentrated freeze point suppressant with a solid material to form at least a portion of the refrigerant 120 of the thermally driven heat pump 114; and/or utilizing the portion of the refrigerant 120 of the thermally driven heat pump 114 to reduce the temperature of the refrigerant 118 of the vapor compression cycle 117 below the ambient temperature. In some embodiments, the method may improve the vapor compression cycle. In some embodiments, the solid material may include ice.

While some embodiments may include a thermally driven heat pump 114 configured as a freeze point suppressant cycle, some embodiments may utilize other thermally driven heat pumps. For example, some embodiments may include, but are not limited to, an absorption heat pump as the thermally driven heat pump 114.

In some embodiments that may utilize a freeze point suppressant cycle as the thermally driven heat pump 114, the freeze point suppressant may include, but is not limited to: water, alcohol, ionic liquids, amines, ammonia, salt, non-salt soluble solids, organic liquid, inorganic liquid, triethylamine, cyclohexopuridine, mixtures of miscible materials, and/or a surfactant-stabilized mixture of immiscible materials. The solid may include a fully or partially solid form of the following, but is not limited to: water, an organic material, an ionic liquid, an inorganic material, and/or DMSO. Other thermally driven heat pumps may utilize refrigerants including mixtures including, but not limited to, water, ammonia, salt, and/or alcohol.

Figure 2A:
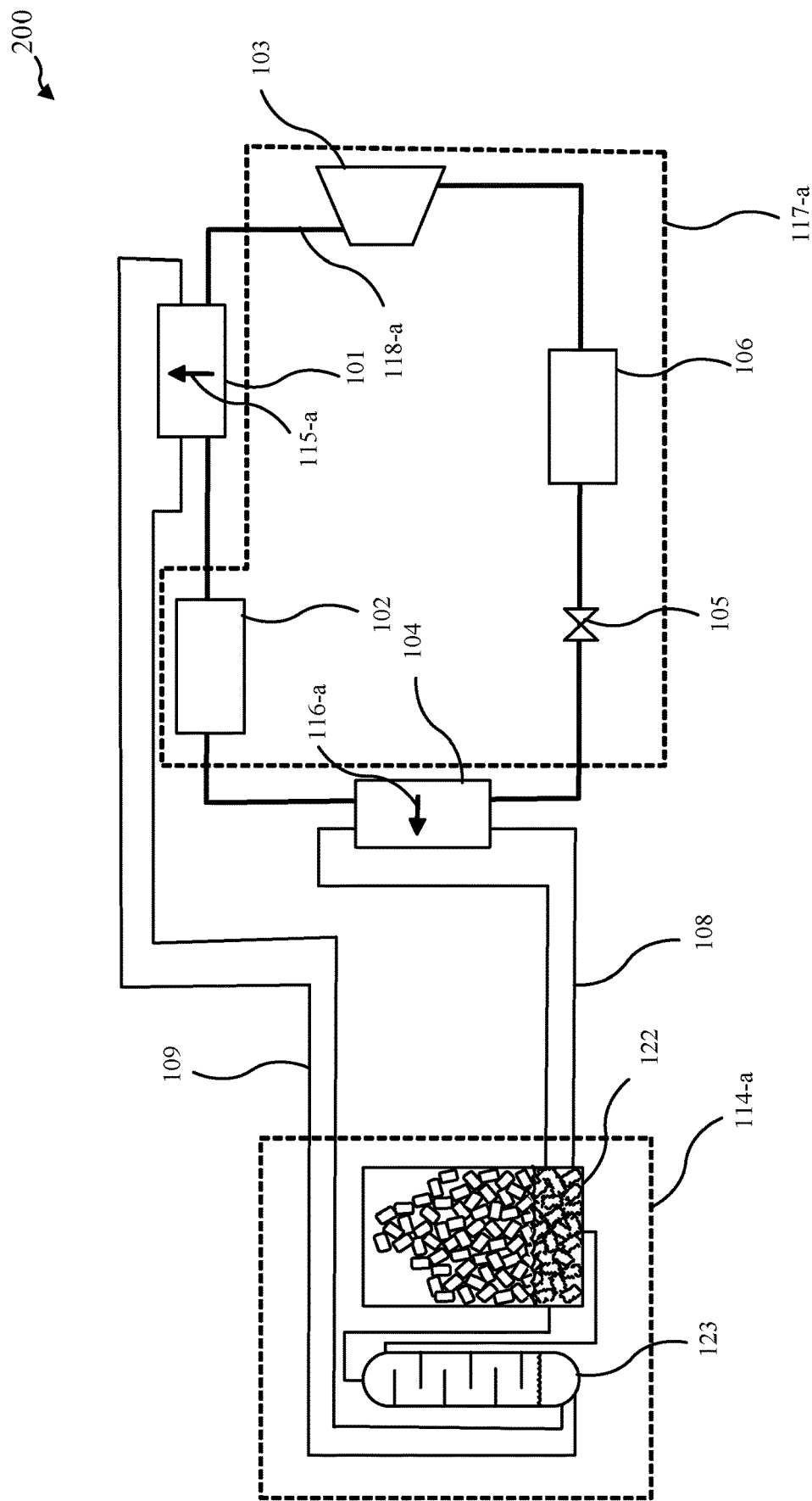
FIG. 2A shows a system in accordance with various embodiments.

Turning now to FIG. 2A, a system 200 in accordance with various embodiments is provided that may show the integration between a freeze point suppression cycle, as an example of a thermally driven heat pump 114-$a$, and a direct expansion vapor compression cycle 117-$a$. System 200 may be an example of system 100 of FIG. 1. Refrigerant 118-$a$ of the vapor compression cycle 117-$a$ leaving a compressor 103 may be fed into a heat exchanger 101 where it may be desuperheated and may provide heat 115-$a$ to the thermally driven heat pump 114-$a$. After leaving heat exchanger 101, the refrigerant 118-$a$ may have been cooled but may still remain above its condensing temperature and ambient temperature. Merely by way of example, this temperature may be approximately 40° C. In some embodiments, the heat exchanger 101 may be referred to as a first heat exchanger; heat 115-$a$ may be referred to as a first removed heat in some embodiments. The heat 115-$a$ may drive the thermally driven heat pump 114-$a$. For example, the heat 115-$a$ from the heat exchanger 101 may warm a freeze point suppression refrigerant 109 of the thermally driven heat pump 114-$a$, as a freeze point suppression cycle, and may power a separator 123; the separator 123 may separate a freeze point suppressant from the freeze point suppression refrigerant 109 to form a concentrated freeze point suppressant. Examples of a separator 123 may include, but are not limited, to a distillation column, a distillation membrane, a multi-effect distiller, a boiler, and/or a mechanical separator. The refrigerant 118-$a$ in the vapor compression cycle 117-$a$ may then flow into a condenser 102 where it may be condensed. Leaving heat exchanger 102, the refrigerant 118-$a$ may be at or just below its condensing temperature but may still be slightly above ambient. Merely by way of example, this temperature may be approximately 30° C. After being condensed, it may flow into another heat exchanger 104, which may be referred to as a liquid sub-cooler, where it may be cooled by a cold refrigerant 108 from the thermally driven heat pump 114-$a$ through the removal of heat 116-$a$, which may be referred to as a second removed heat. Leaving heat exchanger 104, the refrigerant 118-$a$ may now be below ambient. Merely by way of example, this temperature may be approximately −20° C. For example, the cold refrigerant 108 may come from a solid material tank 122, such as an ice tank, as part of a freeze point suppressant cycle. With respect to an embodiment that may utilize a freeze point suppressant cycle, combining a solid, such as ice, and a concentrated freeze point suppressant generated by the separator 123 may create this cold refrigerant 108. The refrigerant 118-$a$ of the vapor compression cycle 117-$a$ that may come out of the heat exchanger 104 may flow to an expansion valve 105 and may expand to a state containing more liquid refrigerant than would normally occur without the use of heat exchanger 104, which may produce liquid sub-cooling. In some embodiments, the heat exchanger 104 may be referred to as a second heat exchanger. Removing heat 116-$a$ may reduce a temperature of the refrigerant 118-$a$ of the vapor compression cycle 117-$a$ below an ambient temperature. The refrigerant 118-$a$ of the vapor compression cycle 117-$a$ may then enter an evaporator 106 where it may boil, which may provide refrigeration. The refrigerant 118-$a$ of the vapor compression cycle 117-$a$ may then flow back to the compressor 103, which may complete the entire cycle.

Figure 2B:
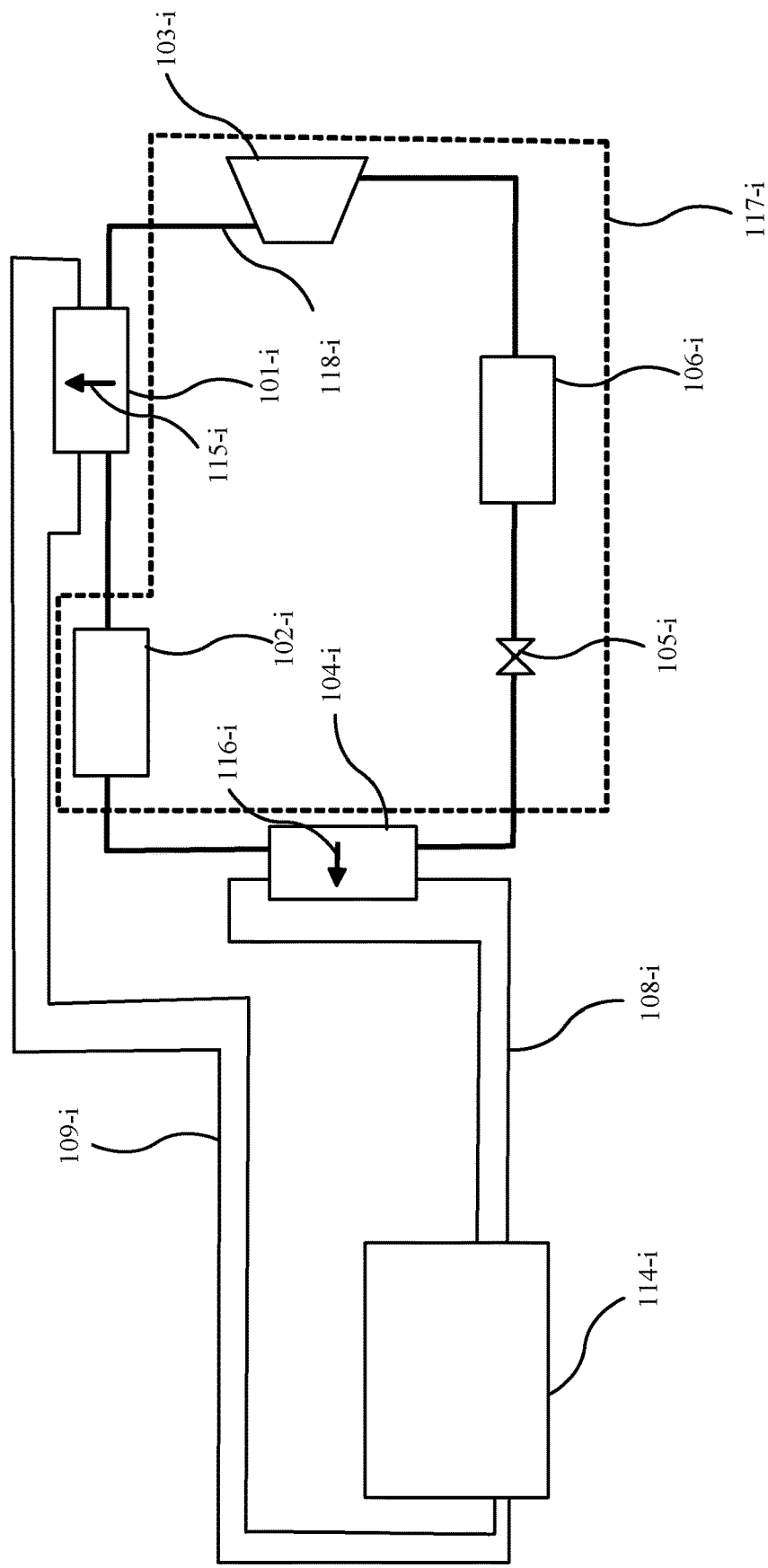
FIG. 2B shows a system in accordance with various embodiments.

FIG. 2B shows a system 200-$a$ in accordance with various embodiments is provided that may show integration between a thermally driven heat pump 114-$i$ and a direct expansion vapor compression cycle 117-$i$. In some embodiments, the thermally driven heat pump 114-$i$ may include an absorption heat pump. System 200-$a$ may be an example of system 100 of FIG. 1 and may include aspects of system 200 of FIG. 2A. Refrigerant 118-$i$ of the vapor compression cycle 117-$i$ leaving a compressor 103-$i$ may be fed into a heat exchanger 101-$i$ where it may be desuperheated and may provide heat 115-$i$ to the thermally driven heat pump 114-$i$. In some embodiments, the heat exchanger 101-$i$ may be referred to as a first heat exchanger; heat 115-$i$ may be referred to as a first removed heat in some embodiments. The heat 115-$i$ may drive the thermally driven heat pump 114-$i$. For example, heat 115-$i$ from the heat exchanger 101-$i$ may warm a refrigerant 109-$i$ of the thermally driven heat pump 114-$i$. The refrigerant 118-$i$ in the vapor compression cycle 117-$i$ may then flow into a condenser 102-$i$ where it may be condensed. After being condensed, it may flow into another heat exchanger 104-$i$, which may be referred to as a liquid sub-cooler, where it may be cooled by a cold refrigerant 108-$i$ from the thermally driven heat pump 114-$i$ through the removal of heat 116-$i$, which may be referred to as a second removed heat. Removing heat 116-$i$ may reduce a temperature of the refrigerant 118-$i$ of the vapor compression cycle 117-$i$ below an ambient temperature. The refrigerant 118-$i$ of the vapor compression cycle 117-$i$ that may come out of the heat exchanger 104-$i$ may flow to an expansion valve 105-$i$ and may expand to a state containing more liquid refrigerant than would normally occur without the use of heat exchanger 104-$i$, which may produce liquid sub-cooling. In some embodiments, the heat exchanger 104-$i$ may be referred to as a second heat exchanger. The refrigerant 118-$i$ of the vapor compression cycle 117-$i$ may then enter an evaporator 106-$i$ where it may boil, which may provide refrigeration. The refrigerant 118-$i$ of the vapor compression cycle 117-$i$ may then flow back to the compressor 103-$i$, which may complete the entire cycle.

Figure 3A:
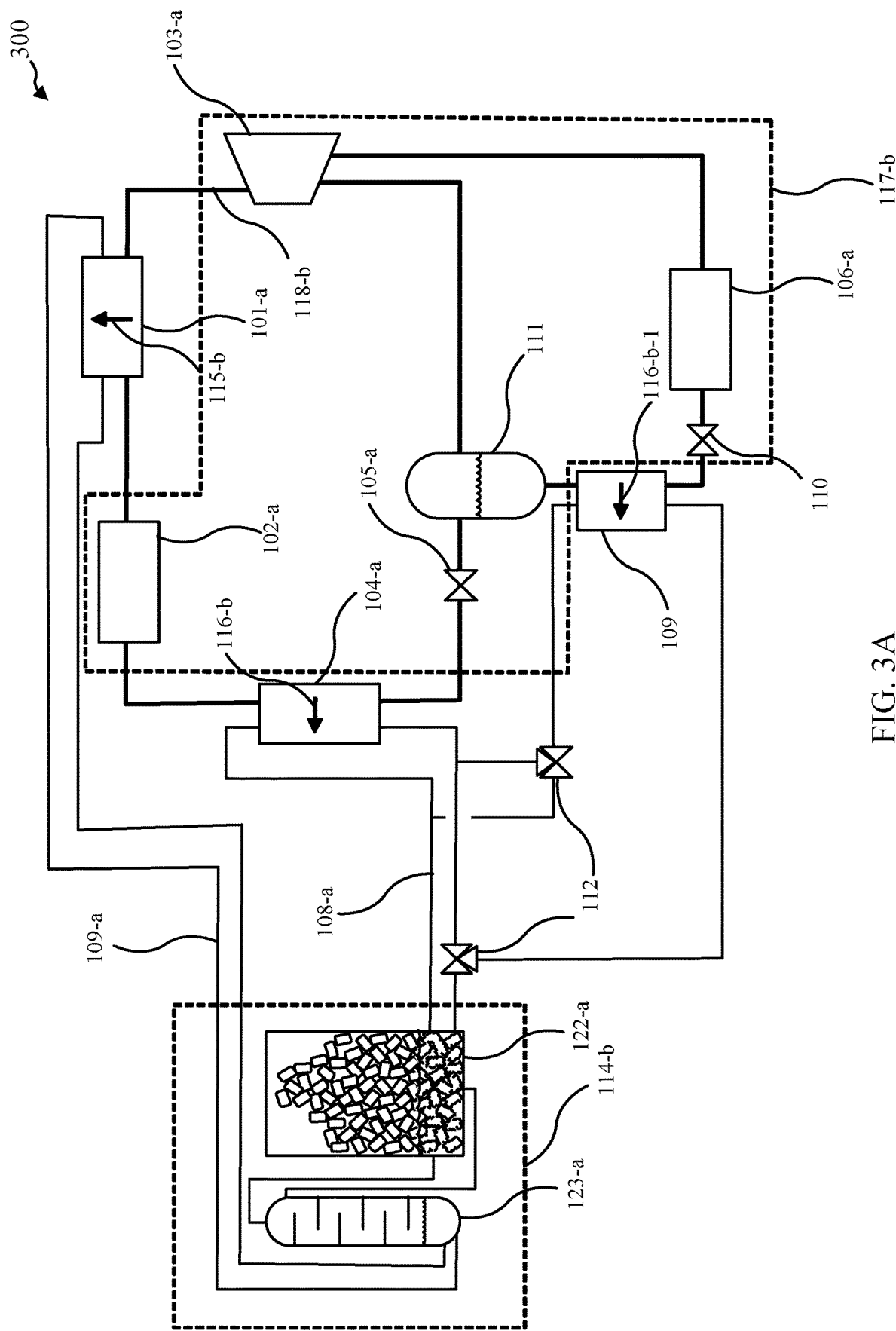
FIG. 3A shows a system in accordance with various embodiments.

Turning now to FIG. 3A, a system 300 is provided in accordance with various embodiments that may show the integration between a thermally driven heat pump 114-$b$, as a freeze point suppression cycle for example, and a single stage economized vapor compression cycle 117-$b$. System 300 may be an example of system 100 of FIG. 1; system 300 may include aspects of system 200 of FIG. 2A and/or system 200-$a$ of FIG. 2B. Refrigerant 118-$b$ of a vapor compression cycle 117-$b$ leaving the compressor 103-$a$ may be fed into a heat exchanger 101-$a$, which may be referred to as a first heat exchanger in some embodiments, where the refrigerant 118-$b$ of the vapor compression cycle 117-$b$ may be desuperheated and may warm a refrigerant 109-$a$ of a thermally driven heat pump 114-$a$. Heat 115-$b$ may be removed from the vapor compression cycle 117-$b$; heat 115-$b$ may be referred to as a first removed heat. The heat 115-$b$ may drive the thermally driven heat pump 114-$b$. In some embodiments, the refrigerant 109-$a$ of the thermally driven heat pump 114-$b$ may include freeze point suppression refrigerant in a freeze point suppression cycle and may power a separator 123-$a$. The refrigerant 118-$b$ of the vapor compression cycle 117-$b$ may then flow into a condenser 102-$a$ where it may be condensed. After being condensed, it may flow into a heat exchanger 104-$a$, which may be referred to as a liquid sub-cooler in some embodiments, where it may be cooled by a cold refrigerant 108-$a$ from the thermally driven heat pump 114-$b$. Heat 116-$b$ may be removed from the vapor compression cycle 117-$b$; heat 116-$b$ may be referred to as a second removed heat. The heat exchanger 104-$a$ may be referred to as a second heat exchanger. Removing heat 116-$b$ may reduce a temperature of the refrigerant 118-$b$ of the vapor compression cycle 117-$b$ below an ambient temperature. In some embodiments, the refrigerant 108-$a$ of the thermally driven heat pump 114-$b$ may include a freeze point suppression refrigerant that may be formed in a solid material tank 122-$a$, such as an ice tank. Some embodiments may include combining or mixing ice, or a solid material in general, and a concentrated freeze point suppressant generated by the separator 123-$a$, which may create this cold refrigerant 108-$a$. The refrigerant 118-$b$ of the vapor compression cycle 117-$b$ coming out of the heat exchanger 104-$a$ may flow to an expansion valve 105-$a$ and may expand to a state containing more liquid refrigerant than may normally occur without liquid sub-cooling. The refrigerant 118-$b$ of the vapor compression cycle 117-$b$ then may enter a receiving vessel 111, which may be referred to as a flash intercooler in some embodiments, where it may be separated into liquid and vapor. The vapor may be sent back to the compressor 103-$a$ and the liquid may be sent to a heat exchanger 109, which may be referred to as a second liquid sub-cooler and/or a third heat exchanger in some embodiments, where the liquid may be cooled again using the cold refrigerant 108-$a$ from thermally driven heat pump 114-$b$ (e.g., refrigerant from the tank 122-$a$); heat 116-$b$-1 may be removed from the vapor compression cycle 117-$b$; heat 116-$b$-1 may be referred to as a third removed heat. Removing heat 116-$b$-1 may further reduce a temperature of the refrigerant 118-$b$ of the vapor compression cycle 117-$b$ below an ambient temperature. Valve(s) 112 in the refrigerant lines may allow for the heat exchanger 104-$a$ and heat exchanger 109 to be operated in series or parallel depending on aspects of the vapor compression cycle 117-$b$. The liquid entering a second expansion valve 110 may now expand to a state containing more liquid than it may without the heat exchanger 109. The refrigerant 118-$b$ in the vapor compression cycle 117-$b$ then may flow to an evaporator 106-$a$ where it may boil, which may provide refrigeration. Next, the refrigerant 118-$b$ of the vapor compression cycle 117-$b$ may flow back to the compressor 103-$a$ and may complete the entire cycle. While system 300 may show the use of a freeze point suppressant cycle as the thermally driven heat pump 114-$b$, other thermally driven heat pumps may be utilized, including, but not limited to, absorption heat pumps.

Figure 3B:
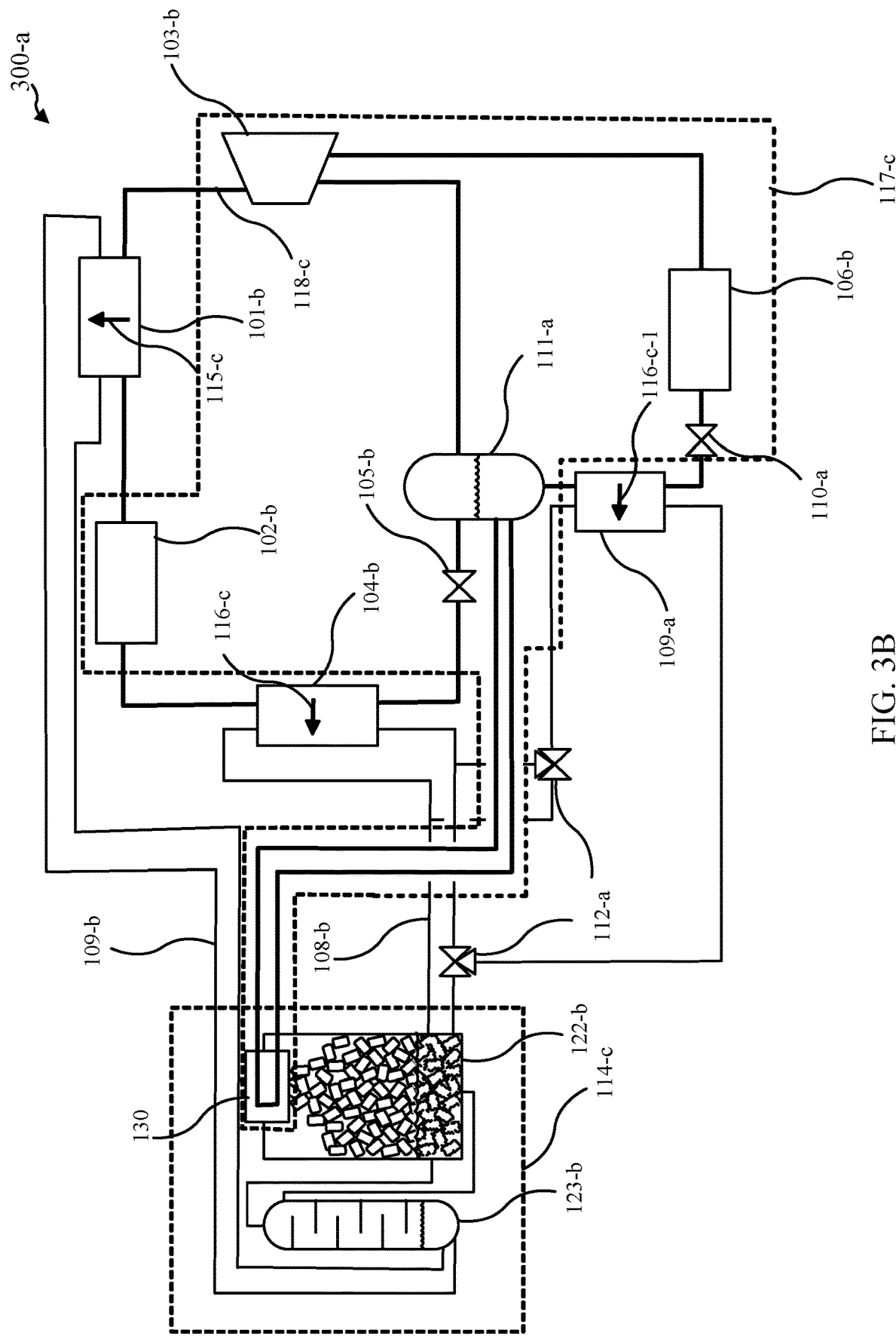
FIG. 3B shows a system in accordance with various embodiments.

FIG. 3B shows a system 300-$a$ in accordance with various embodiments. System 300-$a$ may be an example of system 100 and/or system 300 of FIG. 3A; system 300-$a$ may include aspects of system 200 of FIG. 2A and/or system 200-$a$ of FIG. 2B. System 300-$a$ generally shows the integration between a thermally driven heat pump 114-$c$, shown as a freeze point suppression cycle, and a single stage economized vapor compression cycle 117-$c$. Refrigerant 118-$c$ of the vapor compression cycle 117-$c$ leaving compressor 103-$b$ may be fed into a heat exchanger 101-$b$ where it may be desuperheated and may warm the refrigerant 109-$b$ of the thermally driven heat pump 114-$c$. Heat 115-$c$ may be removed from the vapor compression cycle 117-$c$, which may be referred to as a first removed heat. The heat 115-$c$ may drive the thermally driven heat pump 114-$c$. In some embodiments, the thermally driven heat pump 114-$c$ may include a freeze point suppression cycle configured such that the refrigerant 109-$b$ may power a separator 123-$b$. The refrigerant 118-$c$ in the vapor compression cycle 117-$c$ may then flow into a condenser 102-$b$ where it may be condensed. After being condensed, the refrigerant 118-$c$ of the vapor compression cycle 117-$c$ may flow into a heat exchanger 104-$b$, which may be referred to as a liquid sub-cooler and/or a second heat exchanger, where the refrigerant 118-$c$ of the vapor compression cycle 117-$c$ may be cooled by cold refrigerant 108-$b$ from the thermally driven heat pump 114-$c$, which may include removing heat 116-$c$ from the vapor compression cycle 117-$c$; the heat 116-$c$ may be referred to as a second removed heat. Removing heat 116-$c$ may reduce a temperature of the refrigerant 118-$c$ of the vapor compression cycle 117-$c$ below an ambient temperature. For example, the refrigerant 108-$b$ of the thermally driven heat pump 114$0c$ may come from the tank 122-$b$, which may include an ice tank. Some embodiments include mixing a solid, such as ice, and a concentrated freeze point suppressant generated by the separator 123-$b$ to create cold refrigerant 108-$b$. The refrigerant 118-$c$ of the vapor compression cycle 117-$c$ coming out of the heat exchanger 104-$b$ may flow to an expansion valve 105-$b$ and may expand to a state containing more liquid refrigerant than may normally occur without liquid sub-cooling. The refrigerant 118-$c$ of the vapor compression cycle 117-$c$ may then enter a receiving vessel 111-*a*, which may be referred to as a flash intercooler, where it may be separated into liquid and vapor. Some liquid from this receiving vessel 111-*a* may be used to generate a solid, such as ice, used in the freeze point suppression cycle via a solid maker 130; in some embodiments, the solid maker 130 may include an ice maker. The vapor may be sent back to the compressor 103-*b* and the liquid may be sent to a heat exchanger 109-*a*, which may be referred to as a second liquid sub-cooler and/or third heat exchanger, where it may be cooled again using the cold refrigerant from the thermally driven heat pump 114-*c*, such as refrigerant from ice tank 122-*b*. Heat 116-*c*-1 may be removed from the vapor compression cycle 117-*c*, which may be referred to as a third removed heat. Removing heat 116-*c*-1 may further reduce a temperature of the refrigerant 118-*c* of the vapor compression cycle 117-*c* further below an ambient temperature. Valve(s) 112-*a* in the refrigerant lines may allow for the heat exchangers 104-*b* and 109-*a* to be operated in series or parallel depending on aspects of the vapor compression cycle 117-*c*. The liquid entering a second expansion valve 110-*a* now may expand to a state containing more liquid than it may without the heat exchanger 109-*a*. The refrigerant 118-*c* in the vapor compression cycle 117-*c* then may flow to an evaporator 106-*b* where it may boil, which may provide refrigeration. Next, the refrigerant 118-*b* of the vapor compression cycle 117-*c* may flow back to the compressor 103-*b*, completing the entire cycle. While system 300-*a* may show the use of a freeze point suppressant cycle as the thermally driven heat pump 114-*c*, other thermally driven heat pumps may be utilized, including, but not limited to, absorption heat pumps.

Figure 4:
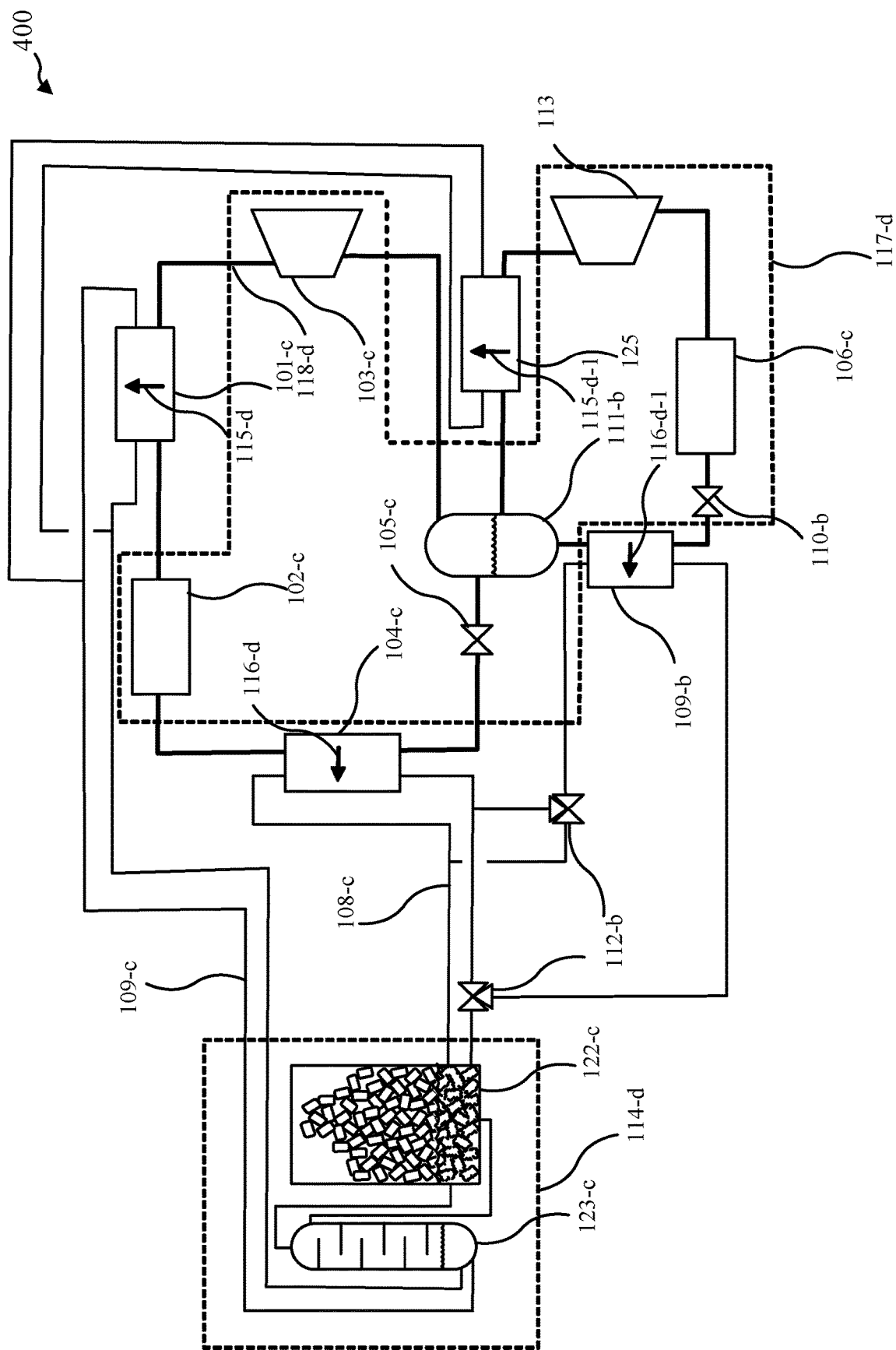
FIG. 4 shows a system in accordance with various embodiments.

Turning now to FIG. 4, a system 400 is provided in accordance with various embodiments that may show the integration between a thermally driven heat pump 114-*d*, such as a freeze point suppression cycle, and a two-stage vapor compression cycle 117-*d*. System 400 may be an example of system 100 of FIG. 1; system 500 may include aspects of system 200 of FIG. 2A, system 200-*a* of FIG. 2B, system 300 of FIG. 3, and/or system 300-*a* of FIG. 3B. Refrigerant 118-*d* of the vapor compression cycle 117-*d* leaving a compressor 103-*c* may be fed into a heat exchanger 101-*c* where it may be desuperheated and may warm a refrigerant 109-*c* of the thermally driven heat pump 114-*d*, such as a freeze point suppression refrigerant in a freeze point suppression cycle, and may partially or fully power a separator 123-*c*. Heat 116-*d* may be removed from the vapor compression cycle 117-*d* and may be referred to as a first removed heat. Heat exchanger 101-*c* may be referred to as a first heat exchanger. The heat 115-*d* may generally drive the thermally driven heat pump 114-*d*. The refrigerant 118-*d* in the vapor compression cycle 117-*d* then may flow into a condenser 102-*c* where it may be condensed. After being condensed, it may flow into a heat exchanger 104-*c*, which may be referred to as a first liquid sub-cooler or a second heat exchanger, where it may be cooled by a refrigerant 108-*c* from thermally driven heat pump 117-*d*. Heat 116-*d* may be removed from the vapor compression cycle 117-*d* and may be referred to as a second removed heat. Removing heat 116-*d* may reduce a temperature of the refrigerant 118-*d* of the vapor compression cycle 117-*d* below an ambient temperature. For example, refrigerant 108-*c* of the thermally driven heat pump 114-*d* may include a freeze point suppression refrigerant from a tank 122-*c*, such as an ice tank. Some embodiments may include combining or mixing a solid, such as ice, and a concentrated freeze point suppressant generated by the separator 123-*c*, which may create this cold refrigerant 108-*c*. The refrigerant 118-*d* of the vapor compression cycle 117-*d* coming out of the heat exchanger 104-*c* may flow to an expansion valve 105-*c* and may expand to a state containing more liquid refrigerant than may normally occur without liquid sub-cooling. The refrigerant 118-*d* of the vapor compression cycle 117-*d* then may enter a receiving vessel 111-*b*, which may be referred to as a flash intercooler, where it may be separated into liquid and vapor. The vapor may be sent back to the compressor 103-*c* and the liquid may be sent to a heat exchanger 109-*b*, which may be referred to as a second liquid sub-cooler and/or a third heat exchanger, where it may be cooled again using the cold refrigerant from the thermally driven heat pump 114-*c*, such as liquid from the ice tank 122-*c*. Heat 116-*d*-1 may be removed from the vapor compression cycle 117-*d* and may be referred to as a third removed heat. Removing heat 116-*d*-1 may further reduce a temperature of the refrigerant 118-*d* of the vapor compression cycle 117-*d* below an ambient temperature. Valve(s) 112-*b* in the refrigerant lines may allow for the heat exchangers 104-*c* and 109-*b* to be operated in series or parallel depending on aspects of the vapor compression cycle 117-*d*. The liquid may enter a second expansion valve 110-*b* may now expand to a state containing more liquid than it may without the heat exchanger 109-*b*. The refrigerant in the vapor compression cycle 117-*d* then may flow to an evaporator 106-*c* where it may boil, which may provide refrigeration. Then the refrigerant 118-*d* of the vapor compression cycle 117-*d* may flow to a second compressor 113 and may be pressurized to the pressure of the receiving vessel 111-*b*. During this process, the refrigerant 118-*d* of the vapor compression cycle 117-*d* may pick up heat again and may enters a heat exchanger 125, which may be referred to as a desuperheater and/or fourth heat exchanger, where it may supply more heat 115-*d*-1 (which may be referred to as a fourth removed heat) to the refrigerant 109-*c* that may partially or fully power the thermally driven heat pump 114-*d*, such as to power separator 123-*c*. Removing heat 115-*d*-1 may be used to drive the thermally driven heat pump 114-*d*. Next, the refrigerant 118-*d* of the vapor compression cycle 117-*d* may flow back to the receiving vessel 111-*b* and may complete the cycle. While system 400 may show the use of a freeze point suppressant cycle as the thermally driven heat pump 114-*d*, other thermally driven heat pumps may be utilized, including, but not limited to, absorption heat pumps.

Figure 5:
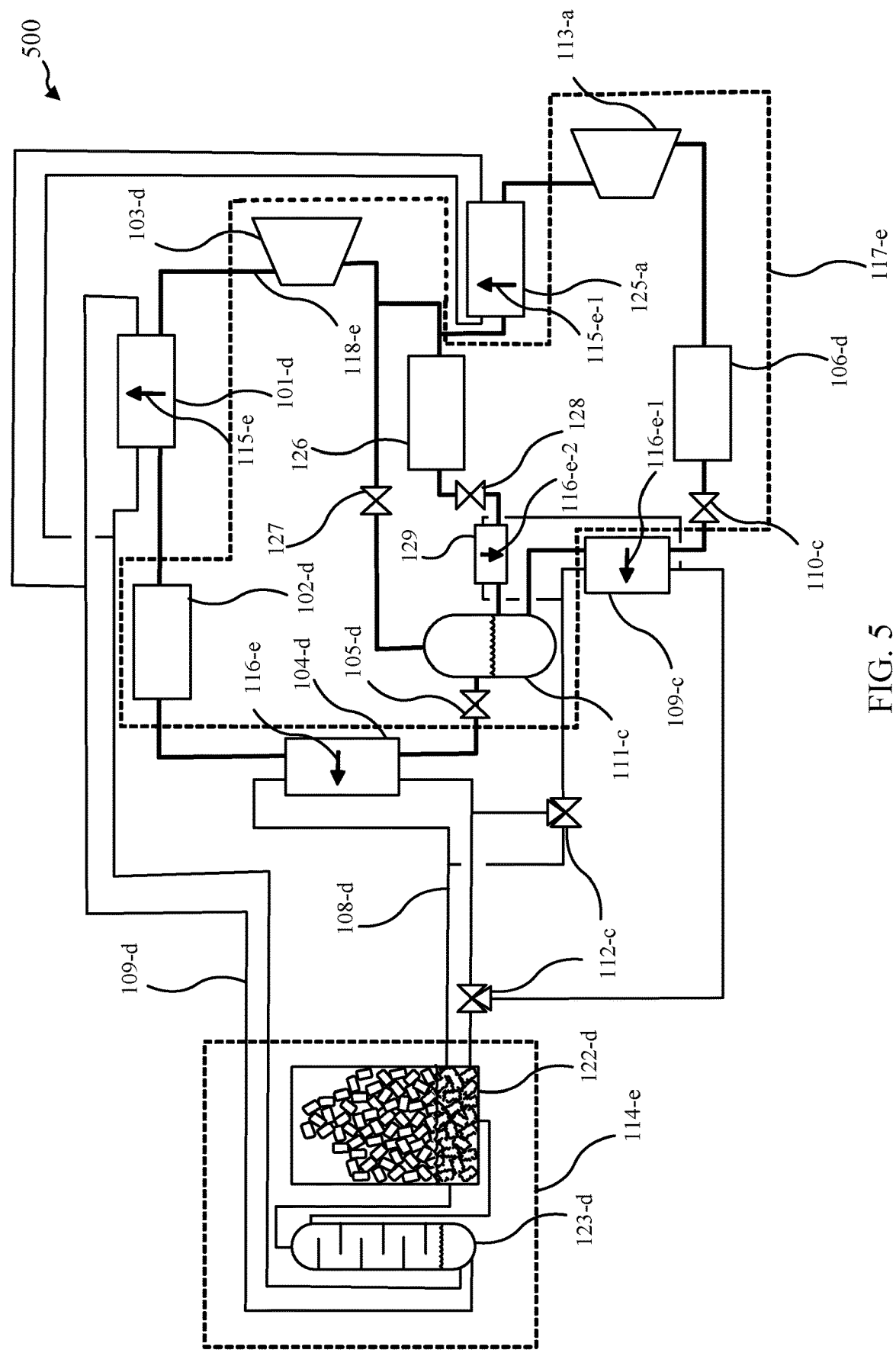
FIG. 5 shows a system in accordance with various embodiments.

FIG. 5 shows a system 500 in accordance with various embodiments. System 500 may be an example of system 100 of FIG. 1; system 500 may include aspects of system 200 of FIG. 2A, system 200-*a* of FIG. 2B, system 300 of FIG. 3, system 300-*a* of FIG. 3B, and/or system 400 of FIG. 4. System 500 may generally show the integration between a thermally driven heat pump 114-*e* and a booster type vapor compression cycle 117-*e*. A refrigerant 118-*e* of the vapor compression cycle 117-*e* that may leave a compressor 103-*d* may be fed into a heat exchanger 101-*d*, which may be referred to as a first heat exchanger, where it may be desuperheated and may warm a refrigerant 109-*d* of the thermally driven heat pump 114-*d*. Heat 115-*e* may be removed from the vapor compression cycle and may be referred to as a first removed heat. The heat 115-*e* may drive the thermally driven heat pump 114-*e*. In some embodiments, the refrigerant 109-*d* of the thermally driven heat pump 114-*e* may include a freeze point suppression refrigerant of a freeze point suppression cycle; the refrigerant 109-*d* may partially or fully power a separator 123-*d* of the freeze point suppressant cycle. The refrigerant 118-*e* in the vapor compression cycle 117-*e* then may flow into condenser 102-*d* where it may be condensed. After being condensed, the refrigerant 118-*e* of the vapor compression cycle 117-*e* may flow into a heat exchanger 104-*d*, which may be referred to as a liquid sub-cooler and/or second heat exchanger, where it may be cooled by refrigerant 108-*d* from the thermally driven heat pump 114-*d*. For example, a freeze point suppression refrigerant from a tank 122-*d*, such as an ice tank, may be utilized. Some embodiments include mixing a solid, such as ice, and a concentrated freeze point suppressant generated by the separator 123-*d* to create this cold refrigerant 108-*d*. Heat 116-*e* may be removed from the vapor compression cycle 117-*e*. Removing heat 116-*e* may reduce a temperature of the refrigerant 118-*e* of the vapor compression cycle 117-*e* below an ambient temperature. The refrigerant 118-*e* of the vapor compression cycle 117-*e* coming out of the heat exchanger 104-*d* may flow to an expansion valve 105-*d* and may expand to a state containing more liquid refrigerant than may normally occur without liquid sub-cooling. The refrigerant 118-*e* of the vapor compression cycle 117-*e* than may enter a receiving vessel 111-*c*, which may be referred to as a flash intercooler, where it may be separated into liquid and vapor. The vapor may be sent back to the compressor 103-*d* via a gas bypass expansion valve 127 and the liquid may be sent to the heat exchanger 109-*c* and/or the heat exchanger 129, which may be referred to as a third heat exchanger and a fifth heat exchanger, respectively, in some embodiments, where the liquid may be cooled again using the cold refrigerant from the thermally driven heat pump 114-*d*. Heat 116-*e*-1 and/or heat 116-*e*-2 may be removed from the vapor compression cycle 117-*e*; heat 116-*e*-1 may be referred to as a third removed heat and heat 116-*e*-2 may be referred to as a fifth removed heat in some embodiments. Removing heat 116-*e*-1 and/or heat 116-*e*-2 may further reduce a temperature of the refrigerant 118-*e* of the vapor compression cycle 117-*e* below an ambient temperature. Valve(s) 112-*c* in refrigerant lines may allow for the heat exchanger 104-*d*, the heat exchanger 109-*c*, and/or the heat exchanger 129 to be operated in series or parallel depending on aspects of the vapor compression cycle. The liquid may enter expansion valves 110-*c* and/or 128 may now expand to a state containing more liquid than it may without the heat exchangers 109-*c* and/or 129. The subcooled refrigerant line that went through a medium temperature expansion valve 128 then may enter a medium temperature evaporator 126 where it may boil, which may provide refrigeration. Merely by way of example, the medium in this case may refer to temperatures near 0° C. The refrigerant 118-*e* of the vapor compression cycle 117-*e* that went through a low temperature expansion valve 110-*c* may flow to the low temperature evaporator 106-*d* where it may boil, which may provide refrigeration. This refrigerant 118-*e* of the vapor compression cycle 117-*e* then may flow to a second compressor 113-*a* and may be pressurized to the pressure of the medium temperature expanded gas and the bypassed gas. During this process, it may pick up heat again and may enter a heat exchanger 125-*a*, which may be referred to as a fourth heat exchanger, where it may supply more heat 115-*e*-1 to the refrigerant 109-*d* of the thermally driven heat pump 114-*e*. Removing heat 115-*e*-1 may desuperheat the refrigerant leaving the compressor 113-*a* and may drive the thermally driven heat pump 114-*e*. In some embodiments, this may partially or fully power the separator 123-*d*. Finally, one or more of the three refrigerant streams may meet up and flow to the compressor 103-*d*, completing the cycle. While system 500 may show the use of a freeze point suppressant cycle as the thermally driven heat pump 114-*e*, other thermally driven heat pumps may be utilized, including, but not limited to, absorption heat pumps.

Figure 6A:
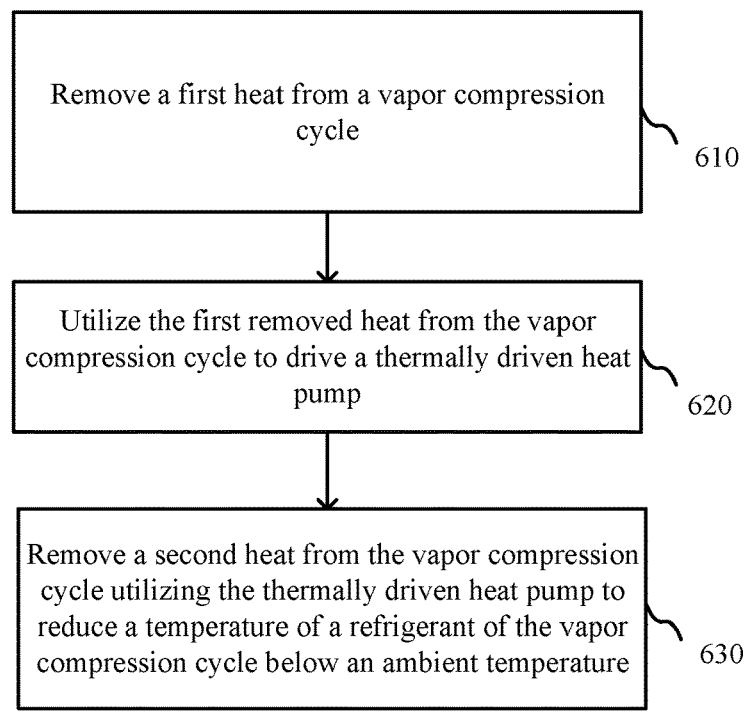
FIG. 6A shows a flow diagram of a method in accordance with various embodiments.

FIG. 6A shows a flow chart of a method 600 in accordance with various embodiments. Method 600 may be implemented utilizing aspects of system 100 of FIG. 1, system 200 of FIG. 2A, system 200-*a* of FIG. 2B, system 300 of FIG. 3A, system 300-*a* of FIG. 3B, system 400 of FIG. 4, and/or system 500 of FIG. 5.

At block 610, a first heat may be removed from a vapor compression cycle. At block 620, the first removed heat from the vapor compression cycle may be utilized to drive a thermally driven heat pump. At block 630, a second heat from the vapor compression cycle may be removed utilizing the thermally driven heat pump to reduce a temperature of a refrigerant of the vapor compression cycle below an ambient temperature.

In some embodiments of the method 600, utilizing the first removed heat from the vapor compression cycle to drive the thermally driven heat pump includes separating a freeze point suppressant from a refrigerant of the thermally driven heat pump to form a concentrated freeze point suppressant. Removing the second heat from the vapor compression cycle utilizing the thermally driven heat pump to reduce the temperature of the refrigerant of the vapor compression cycle below the ambient temperature may include: combining the concentrated freeze point suppressant with a solid material to form at least a portion of the refrigerant of the thermally driven heat pump; and/or utilizing the portion of the refrigerant of the thermally drive heat pump to reduce the temperature of the refrigerant of the vapor compression cycle below the ambient temperature. In some embodiments, the method may improve the vapor compression cycle.

In some embodiments of the method 600, removing the first heat from the vapor compression cycle includes passing the refrigerant of the vapor compression cycle through a first heat exchanger that is thermally coupled with the thermally driven heat pump. The first heat exchanger may be positioned between a compressor of the vapor compression cycle and a condenser of the vapor compression cycle.

In some embodiments of the method 600, removing the second heat from the vapor compression cycle utilizing the thermally driven heat pump to reduce the temperature of refrigerant of the vapor compression cycle below the ambient temperature includes passing the refrigerant of the vapor compression cycle through a second heat exchanger positioned between a condenser of the vapor compression cycle and an expansion valve of the vapor compression cycle. In some embodiments, removing the second heat from the vapor compression cycle utilizing the thermally driven heat pump to reduce the temperature of refrigerant of the vapor compression cycle below the ambient temperature includes passing a refrigerant of the thermally driven heat pump through the second heat exchanger.

Some embodiments of the method 600 include utilizing a receiving vessel to receive at least a liquid form of the refrigerant of the vapor compression cycle or a vapor form of the refrigerant of the vapor compression cycle after the refrigerant of the vapor compression cycle passes through the expansion valve of the vapor compression cycle. Some embodiments include: directing the vapor form of the refrigerant to the compressor of the vapor compression cycle; and/or directing at least a first portion of the liquid form of the refrigerant of the vapor compression cycle to a third heat exchanger; the third heat exchanger may be thermally coupled with a refrigerant of the thermally driven heat pump and may further cool the first portion of the liquid form of the refrigerant of the vapor compression cycle below the ambient temperature through removing a third heat from the vapor compression cycle. Some embodiments include utilizing the second heat exchanger and the third heat exchanger in series. Some embodiments include utilizing the second heat exchanger and the third heat exchanger in parallel.

Some embodiments of the method 600 include forming a solid material through directing at least a second portion of the liquid form of the refrigerant of the vapor compression cycle to a solid maker. The solid material may include a frozen material, for example. Some embodiments include: combining a freeze point suppressant with the solid material to form at least a portion of a refrigerant of the thermally driven heat pump; and/or passing the portion of the refrigerant of the thermally driven heat pump through the second heat exchanger to reduce the temperature of the refrigerant of the vapor compression cycle below the ambient temperature.

Some embodiments of the method 600 include: directing the liquid form of the refrigerant of the vapor compression cycle to a second expansion valve; and/or passing the refrigerant of the vapor compression cycle that has passed through the second expansion valve to a fourth heat exchanger to remove a fourth heat from the vapor compression cycle. Some embodiments include utilizing the fourth removed heat from the vapor compression cycle to drive the thermally driven heat pump. In some embodiments, utilizing the fourth removed heat from the vapor compression cycle to drive the thermally driven heat pump includes separating a freeze point suppressant from a refrigerant of the thermally driven heat pump to form a concentrated freeze point suppressant.

Some embodiments of the method 600 include directing the refrigerant of the vapor compression cycle from the fourth heat exchanger to the receiving vessel. Some embodiments include directing at least a third portion of the liquid form of the refrigerant of vapor compression cycle to a fifth heat exchanger; the fifth heat exchanger may be thermally coupled with the refrigerant of the thermally driven heat pump and may further cool the third portion of the liquid form of the refrigerant of the vapor compression cycle below the ambient temperature through removing a fifth heat from the vapor compression cycle. Some embodiments include: directing the refrigerant of the vapor compression cycle from the fourth heat exchanger to the compressor; and/or directing the refrigerant of the vapor compression cycle from the fifth heat exchanger to the compressor.

Figure 6B:
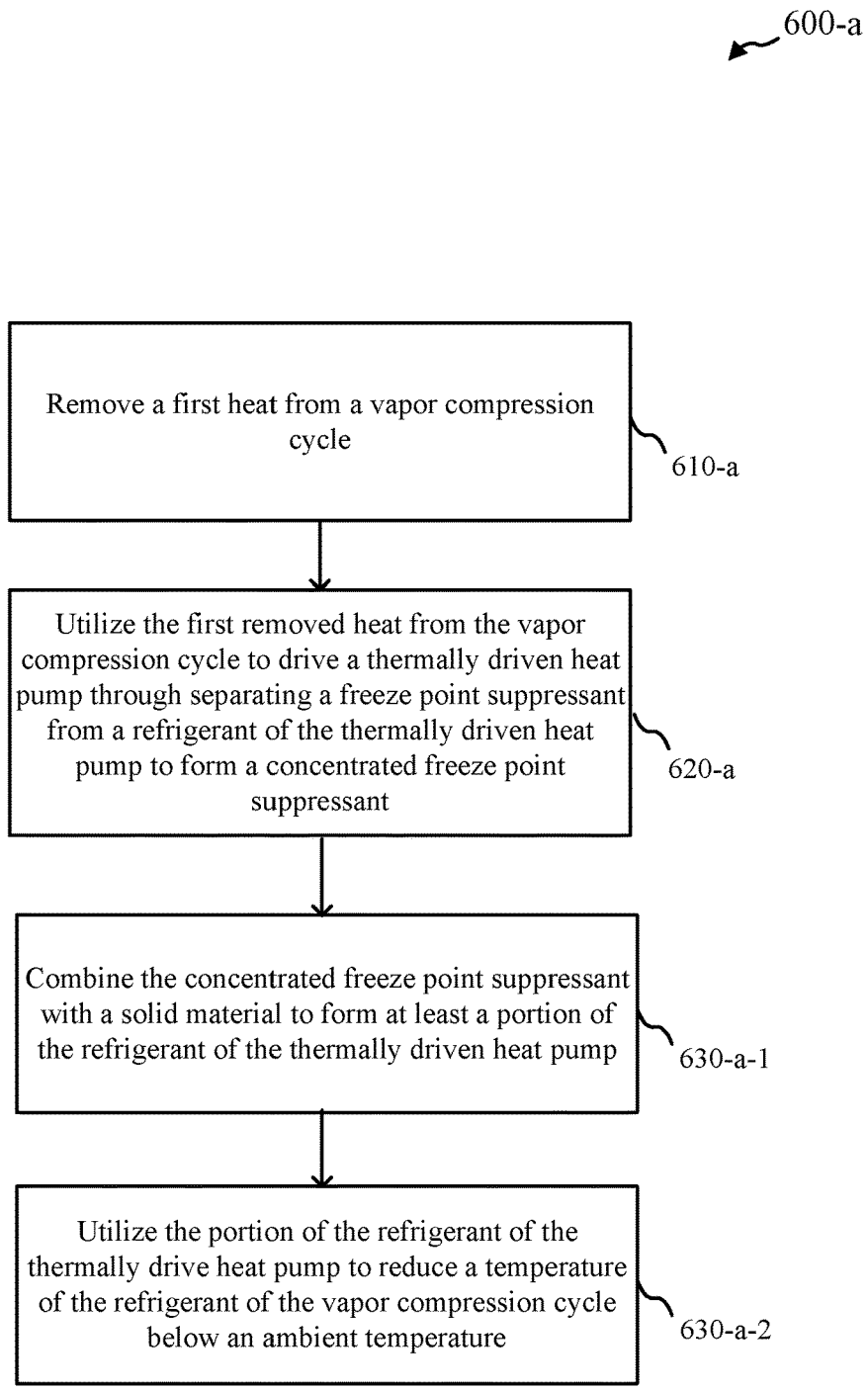
FIG. 6B shows a flow diagram of a method in accordance with various embodiments.

FIG. 6B shows a flow chart of a method 600-a in accordance with various embodiments. Method 600 may be implemented utilizing aspects of system 100 of FIG. 1, system 200 of FIG. 2A, system 200-a of FIG. 2B, system 300 of FIG. 3A, system 300-a of FIG. 3B, system 400 of FIG. 4, and/or system 500 of FIG. 5. Method 600-a may be an example of method 600 of FIG. 6A.

At block 610-a, a first heat may be removed from a vapor compression cycle. At block 620-a, the first removed heat from the vapor compression cycle may be utilized to drive a thermally driven heat pump through separating a freeze point suppressant from a refrigerant of the thermally driven heat pump to form a concentrated freeze point suppressant. At block 630-a-1, the concentrated freeze point suppressant may be combined with a solid material to form at least a portion of the refrigerant of the thermally driven heat pump. At block 630-a-2, the portion of the refrigerant of the thermally driven heat pump may be utilized to reduce a temperature of the refrigerant of the vapor compression cycle below an ambient temperature.

These embodiments may not capture the full extent of combination and permutations of materials and process equipment. However, they may demonstrate the range of applicability of the method, devices, and/or systems. The different embodiments may utilize more or less stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A system comprising:
   a first heat exchanger coupled with a vapor compression cycle to remove a first heat from the vapor compression cycle and coupled with a thermally driven heat pump to drive the thermally driven heat pump utilizing the first removed heat from the vapor compression cycle; and
   a second heat exchanger coupled with the vapor compression cycle to remove a second heat from the vapor compression and coupled with the thermally driven heat pump, wherein removing the second heat from the vapor compression cycle reduces a temperature of a refrigerant of the vapor compression cycle below an ambient temperature.

2. The system of claim 1, further comprising:
   a second heat exchanger coupled with the vapor compression cycle to remove a second heat from the vapor compression and coupled with the thermally driven heat pump, wherein removing the second heat from the vapor compression cycle reduces a temperature of a refrigerant of the vapor compression cycle below an ambient temperature.

3. The system of claim 1, wherein the first heat exchanger is positioned between a compressor of the vapor compression cycle and a condenser of the vapor compression cycle.

4. The system of claim 3, wherein the second heat exchanger is positioned between the condenser of the vapor compression cycle and an expansion valve of the vapor compression cycle.

5. The system of claim 1, wherein the thermally driven heat pump includes a freeze point suppressant cycle.

6. The system of claim 2, wherein the first removed heat from the vapor compression cycle drives the thermally driven heat pump through separating a freeze point suppressant from a refrigerant of the thermally driven heat pump to form a concentrated freeze point suppressant.

7. The system of claim 6, wherein the thermally driven heat pump includes a solid maker.

8. The system of claim 7, wherein:
the thermally driven heat pump is configured to combine a solid from the solid maker with the concentrated freeze point suppressant to form at least a portion of the refrigerant of the thermally driven heat pump; and
the second heat exchanger is configured to receive the portion of the refrigerant of the thermally driven heat pump to reduce the temperature of the refrigerant of the vapor compression cycle below the ambient temperature.

9. The system of claim 4, further comprising a receiving vessel positioned to receive at least a liquid form of the refrigerant of the vapor compression cycle or a vapor form of the refrigerant of the vapor compression cycle after the refrigerant of the vapor compression cycle passes through the expansion valve of the vapor compression cycle.

10. The system of claim 9, further comprising a third heat exchanger configured to receive at least a first portion of the liquid form of the refrigerant of the vapor compression cycle, wherein the third heat exchanger is thermally coupled with the refrigerant of the thermally driven heat pump and further cools the first portion of the liquid form of the refrigerant of the vapor compression cycle below the ambient temperature through removing a third heat from the vapor compression cycle.

11. The system of claim 10, wherein the second heat exchanger and the third heat exchanger are utilized in series.

12. The system of claim 10, wherein the second heat exchanger and the third heat exchanger are utilized in parallel.

13. The system of claim 9, wherein the receiving vessel is coupled with the thermally driven heat pump such that at least a second portion of the liquid form of the refrigerant of the vapor compression cycle is directed to a solid maker of the thermally driven heat pump.

14. The system of claim 10, further comprising a fourth heat exchanger positioned to receive a portion of the refrigerant of the vapor compression cycle that passes through the third heat exchanger to remove a fourth heat from the vapor compression cycle.

15. The system of claim 14, wherein the fourth heat exchanger and the thermally driven heat pump are coupled with each other such that the fourth removed heat from the vapor compression cycle drives the thermally driven heat pump.

16. The system of claim 15, wherein the thermally driven heat pump includes a separator configured to receive the fourth removed heat from the vapor compression cycle to separate a freeze point suppressant from the refrigerant of the thermally driven heat pump to form a concentrated freeze point suppressant.

17. The system of claim 16, wherein:
the thermally driven heat pump is configured to combine a solid from a solid maker with the concentrated freeze point suppressant to form at least a portion of a refrigerant of the thermally driven heat pump; and
the second heat exchanger is configured to receive the portion of the refrigerant of the thermally driven heat pump to reduce the temperature of the refrigerant of the vapor compression cycle below the ambient temperature.

18. The system of claim 14, wherein the fourth heat exchanger is coupled with the receiving vessel such that the receiving vessel receives the portion of the refrigerant from the vapor compression cycle that has passed through the fourth heat exchanger.

19. The system of claim 18, further comprising a fifth heat exchanger that is thermally coupled with the refrigerant of the thermally driven heat pump to remove a fifth heat from the vapor compression cycle and is coupled with the receiving vessel to receive at least a third portion of the liquid form of the refrigerant of the vapor compression cycle that is further cooled below the ambient temperature through removing the fifth heat from the vapor compression cycle.

20. The system of claim 19, wherein:
the fourth heat exchanger is coupled with the compressor to direct the refrigerant of the vapor compression cycle from the fourth heat exchanger to the compressor; and
the fifth heat exchanger is coupled with the compressor to direct the refrigerant of the vapor compression cycle from the fifth heat exchanger to the compressor.

* * * * *